(12) United States Patent
Kroth et al.

(10) Patent No.: US 7,644,941 B2
(45) Date of Patent: Jan. 12, 2010

(54) TWO-WHEEL AXLE SUSPENSION ARRANGEMENT FOR AN AGRICULTURAL MACHINE

(75) Inventors: Rogerio Kroth, Horizontina (BR); Ademar Gelbhan, Santa Rosa (BR)

(73) Assignee: Deere & Company, Moline, IL (US)

( * ) Notice: Subject to any disclaimer, the term of this patent is extended or adjusted under 35 U.S.C. 154(b) by 1 day.

(21) Appl. No.: 12/031,491

(22) Filed: Feb. 14, 2008

(65) Prior Publication Data

US 2008/0191442 A1      Aug. 14, 2008

(30) Foreign Application Priority Data

Feb. 14, 2007     (DE) .................... 10 2007 007 277

(51) Int. Cl.
  *B60G 1/04*       (2006.01)
(52) U.S. Cl. ................................. 280/124.11
(58) Field of Classification Search ............ 280/124.11, 280/124.111, 124.113, 124.114, 124.116, 280/124.117, 124.156
  See application file for complete search history.

(56) References Cited

U.S. PATENT DOCUMENTS

| | | | | |
|---|---|---|---|---|
| 2,032,657 A | * | 3/1936 | Frederickson | 280/124.111 |
| 2,548,507 A | * | 4/1951 | Wharam et al. | 280/124.156 |
| 2,755,100 A | * | 7/1956 | Giacosa | 280/124.177 |
| 2,942,893 A | * | 6/1960 | Nallinger | 280/124.111 |
| 5,505,479 A | | 4/1996 | Lee | |
| 6,142,494 A | * | 11/2000 | Higuchi | 280/93.51 |
| 7,029,016 B2 | * | 4/2006 | Lin | 280/93.502 |
| 7,077,407 B2 | * | 7/2006 | Shin | 280/124.107 |
| 7,144,022 B2 | * | 12/2006 | Bordini | 280/124.109 |
| 2006/0038371 A1 | * | 2/2006 | Bordini | 280/124.113 |

FOREIGN PATENT DOCUMENTS

| | | |
|---|---|---|
| DE | 698 18 354 | 4/2004 |
| DE | 20 2004 004 168 | 7/2004 |
| EP | 0 190 978 | 9/1988 |
| EP | 1 325 722 | 7/2003 |
| GB | 2 231 539 | 11/1990 |
| WO | 90/00011 | 1/1990 |

\* cited by examiner

*Primary Examiner*—Faye M. Fleming

(57) ABSTRACT

An axle suspension for first and second implement ground support wheels, the axle suspension comprising a housing connected to the implement frame and having an interior portion supporting first and second axle carriers for pivoting about first and second pivotal axes. The axle carriers each include outwardly extending members projecting from opposite sides of the housing and upright members fixed to the outwardly extending members for pivoting therewith about the first and second pivotal axes. A connector extending between the upper ends of the upright members constrains the axle carriers for rotation in the same direction about their respective pivotal axes.

18 Claims, 3 Drawing Sheets

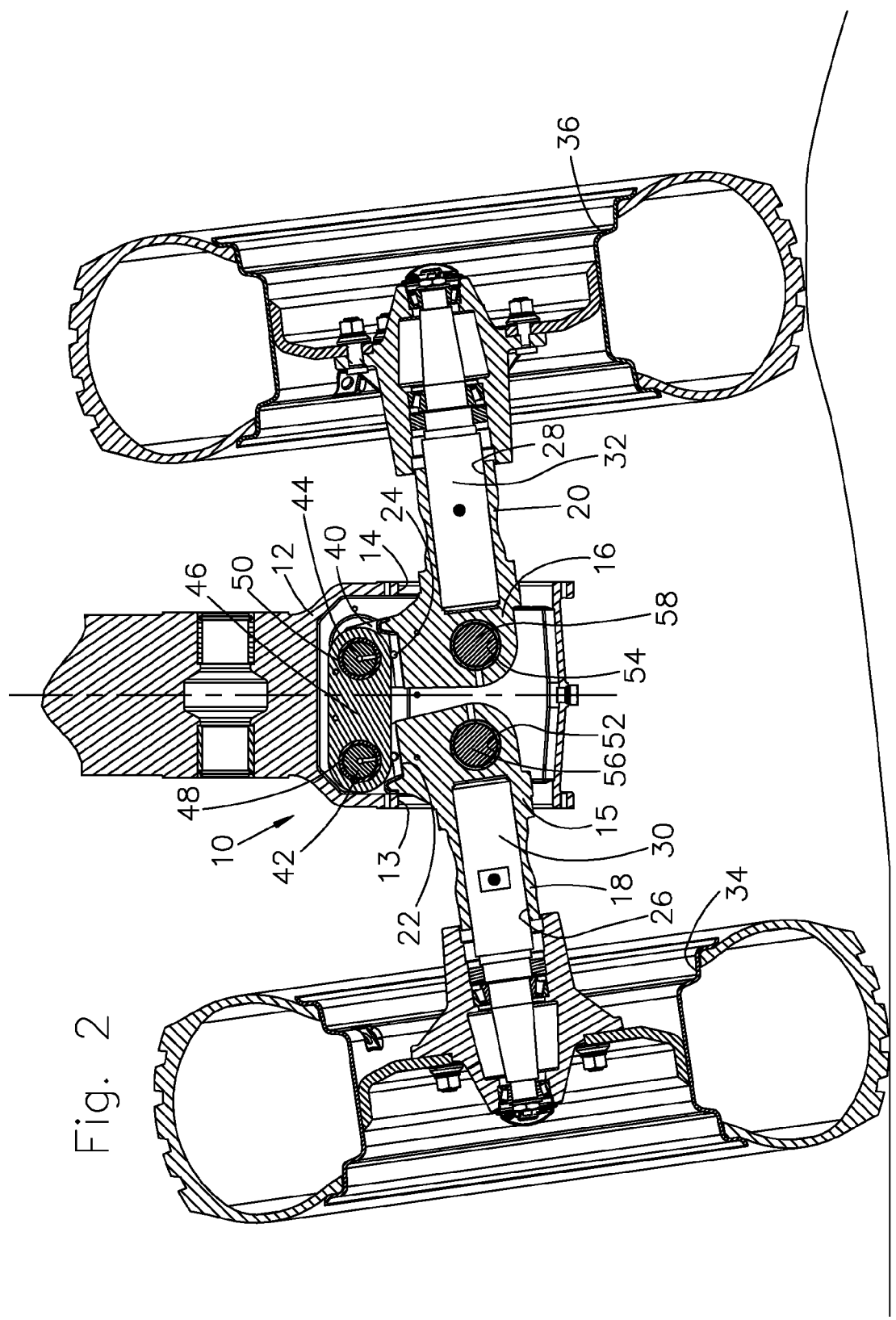

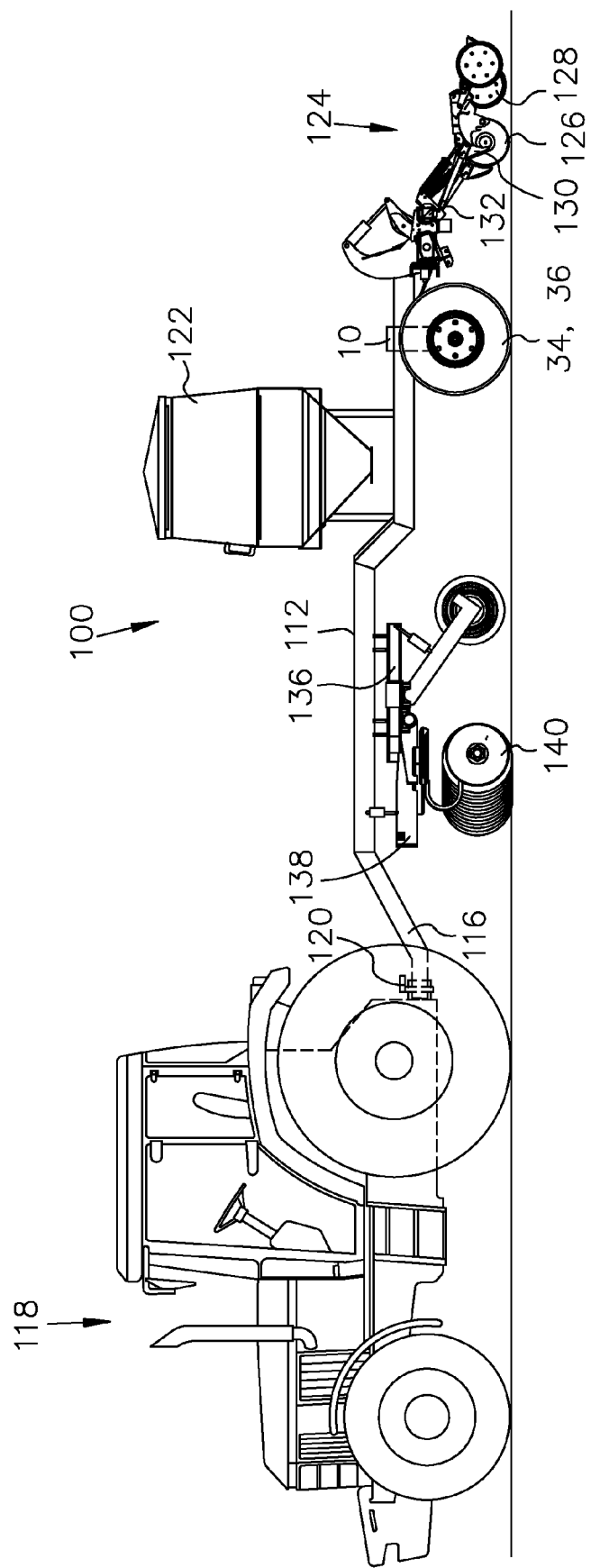

TWO-WHEEL AXLE SUSPENSION ARRANGEMENT FOR AN AGRICULTURAL MACHINE

FIELD OF THE INVENTION

The invention relates to a two-wheel axle suspension for an agricultural machine, the suspension having a housing which accommodates at least two axle carriers, each connected to a wheel axle.

BACKGROUND OF THE INVENTION

Steadily increasing demands for productivity and performance placed on agricultural machines and implements, especially soil tilling implements and combined cultivating and sowing machines, is resulting in larger machines. These include soil tilling implements and cultivating machines such as ploughs, harrows, cultivators, rotary hoes and planters, sowing machines and drilling machines, or cultivating and sowing machines which are a combination of two or more of the aforementioned implements. The increasing geometric dimensions of these machines and implements in turn lead to an increase in the weight. The resulting increased pressure exerted on the soil by the wheels increases compaction of the soil, which may have a negative effect on soil cultivation and tilling.

One possible way of reducing compaction is to distribute the weight of the machine or the implement over a larger soil contact area. Typically this is achieved by distributing load to two wheels rather than one to thereby create a larger contact area. Machines and implements fitted with two-wheel arrangements therefore exert a lesser soil pressure than similar machines and implements with single-wheel arrangements. Less soil pressure and compaction has a positive effect on soil cultivation and tilling. Axle suspensions with two wheel axles rigidly connected together are used to transmit loads evenly to both wheels.

Such two-wheel arrangements are disclosed in EP 1179289 A2, for example, wherein an attachment frame for soil tilling implements is provided with two-wheel arrangements. Each wheel arrangement includes an axle suspension with a wheel axle that extends on both sides of an axle suspension housing. The wheel axles are rigidly connected relative to one another so the weight of the frame and the implement acting on the wheel arrangement is distributed to both wheel axles and to the wheels. The fact that the wheel axles are rigidly connected to one another has a disadvantageous effect since the wheels cannot move independently of one another in a vertical direction, and in certain situations the weight cannot be optimally distributed. If one of the wheels is raised by an elevation or irregularity in the ground, the second wheel is also raised and lifted from full soil contact. If just one of the wheels encounters a depression in the ground, the second wheel keeps the first wheel out of ground contact. Similar effects occur when the soil tilling implement is used on inclines.

SUMMARY OF THE INVENTION

The object of the invention is to provide an improved axle suspension of the aforementioned type which overcomes the aforementioned problems. According to the invention pivoting axle carriers mounted within a housing are connected to the respective wheel axles and are connected together so that pivoting of one of the carriers about its axis results in pivoting of the other carrier in the same direction about its axis.

The axle arrangement includes pivoting bodies, each of which comprise a first member connected to the respective wheel axle and a second member. The first members extend on opposite sides of the housing and are rigidly connected to the second members. The pivoting bodies are supported from at least one pivot axis fixed in the housing. Connecting structure constrains the pivoting bodies for rotation together so that a pivoting movement of one pivoting body about its pivot axis produces a pivoting movement of the other pivoting body in the same direction about its pivot axis. It should be pointed out that a member connected to the wheel axle can be either a member that is integrally and permanently connected to the wheel axle in the form of a cast, forged or welded part, for example, or an assembly detachably connected to the wheel axle, such as an assembled socket connection, for example. The term connected here to be interpreted as including an integral connection, so that the member and the wheel axle may constitute a single component. The axle carriers take the form of pivoting bodies and the wheel axles are connected to the axle carrier on both sides of the housing, and such a construction allows the wheel axles and hence also the wheels mounted on the wheel axle to swivel or tilt. The pivoting movements of the pivoting bodies are restricted or controlled by the connecting structure. When one pivoting body is pivoted or swiveled in one direction of rotation, the other pivoting body is pivoted or swiveled to the same extent in the same direction of rotation. At the same time the connecting structure ensures that the leverage acting on the respective pivoting body is also transmitted to the other pivoting body so that forces are distributed uniformly to both pivoting bodies. If, when running over an irregularity in the ground surface, for example, a wheel connected to the one pivoting body by one wheel axle is deflected, this deflection is transmitted to the other pivoting body, which in turn deflects the other wheel axle and the wheel connected thereto in an opposite direction to the first wheel. If the wheel on one side of the wheel suspension is raised, the wheel on the other side is correspondingly lowered. This action ensures that both wheels maintain equal ground contact. The pivoting body itself may assume widely varying geometric shapes and is not confined to a two-member structure. Rather, the term member is here intended to signify the moment levers acting about the pivot axis, which in a pivoting movement of the pivoting body about the pivot axis or due to deflection of one member or the moment lever give rise to a deflection of the other member or moment lever on the kinematic lever principle.

A fixedly supported pivot axis is preferably provided for each pivoting body. Design advantages can ensue from this, especially with regard to a compact construction. The functionality of the axle suspension, both with a common pivot axis and with two separate pivot axes is assured, however, provided that the connection established by the connection structure constrains the pivoting bodies to swivel in the same direction of rotation. This can be achieved, both for a common pivot axis and for two separate pivot axes, through a corresponding design of the pivoting arrangement members. The appropriate design and the geometric dimensions of the connecting structure and the pivoting bodies in each particular case will be readily feasible for a person skilled in the art on the basis of his specialized knowledge, for which reason this will not be explored further here.

The connecting structure preferably comprise a connecting strut and connecting pins pivotally connecting strut to the pivoting bodies. The connecting strut is firmly but torsionally and pivotally connected, that is to say articulated, to the pivoting body by the connecting pins. The connecting strut constitutes a rigid connecting element which is capable of transmitting forces in at least two directions. The connecting strut serves to couple the pivoting bodies together and ensures that the distance between the connection points at which the connecting strut is pivotally fixed to the pivoting body by the connecting pins always remains constant so that as the pivoting bodies swivel the angle of rotation of one pivoting body is equal to the angle of rotation of the other pivoting body.

The connecting structure preferably is arranged at a distance from the pivot axis of each pivoting body so that the second member can exert a lever action on the first member about the pivot axis. The greater the distance, the greater the lever action exerted on the first member. At the same time, the distance selected should not be too great so that the deflections of the second members and the amount of swivel at the end of the members remain within the design limits for the housing of the axle suspension. A design compromise has to be found here between the nature of the material in terms of strength and the requisite transmission of force, and the geometrical dimensions and compactness.

The connecting structure preferably is arranged on the second member, so that the length of the second member acts as a lever on the first member about the pivot axis. The connecting structure here is preferably arranged at the ends of the second member in order to obtain a compact construction. It is also feasible, however, to arrange the connecting means elsewhere.

The pivot axis of each pivoting body is preferably arranged between the first and the second member. It may be arranged at any other point on the pivoting body, however, provided that a lever to the connecting means is created so that a pivoting movement of the pivoting body about the pivot axis produces a swiveling travel at the connection points of the connecting structure.

The members of each pivoting body are rigidly arranged at an angle of preferably 90° to one another. However, differing angular arrangements, other than 0° and 180°, may also be chosen.

Pivot pins, which at their ends are supported in bearing apertures, are preferably provided for the pivot axis or pivot axes. The bearing apertures are preferably formed on a housing wall of the housing. The apertures, for example, can take the form of recesses in the housing wall or bushings fixed to the housing.

A guide aperture, running between the bearing apertures on each of the pivot pins, is formed on the pivoting bodies between the first and the second members. Obviously, the chosen arrangement can also be reversed so that, for example, the pivot axis and the bearing apertures of the pivot pins are formed on the pivoting body and guide apertures are formed on the housing. The guide aperture and/or the bearing apertures may be provided with a bearing bushing in order to improve the bearing characteristics and the sliding characteristics in the apertures.

The second members or an area of the second members preferably has shackle-shaped or bifurcated end areas in which bearing apertures are formed and in which the connecting pins are supported.

For proper mating with the bifurcated ends, the connecting strut preferably has two ends with guide apertures journaling the respective connecting pin and pivotally connecting the second members of the pivoting bodies or the area of the swiveling bodies acting as moment lever. Here too the chosen arrangement can obviously be reversed so that the bearing apertures can alternatively also be formed on the connecting strut and the guide apertures correspondingly formed on the pivoting body. In this case, the connecting strut would be shackle-shaped at its ends and the second members would be provided with a guide aperture at their end. The guide aperture and/or the bearing apertures may be provided with a bearing bushing in order to improve the bearing characteristics and the sliding characteristics in the apertures. Articulated and/or pivot connections other than those described above are feasible in respect of the pivoting bodies and connecting structure, provided that a pivoting connection is established between pivoting body and connecting means and between pivoting body and pivot axis.

The pivot pins and the connecting pins preferably extend horizontally to the ground and transversely to the direction of extension of the first members (that is, generally transverse to the axes of rotation of the wheels) so that the wheels can move vertically and ride up and down over ground surface irregularities. Correspondingly adapted geometries of the swiveling bodies and members of course mean that other alignments and pivoting directions which permit vertical movements of the wheels are feasible.

The first member of the pivoting bodies preferably has a mounting area in the form of a tube in which a wheel axle can be mounted. Other embodiments enabling the pivoting body to be connected to the wheel axle may also be selected. Thus, for example, the wheel axle might be flange mounted on the pivoting body or directly attached to the pivoting body by a welded connection.

In a preferred exemplary embodiment an agricultural machine, in particular a soil tilling implement or a combined cultivating and sowing machine, at least one axle suspension according to the embodiment described above provides support for the relatively massive implement frame. Here the axle suspension is connected to an implement frame of the machine and supports this in relation to the ground. Multiple axle suspensions connected to the implement frame ensure that the weight of the machine is distributed over the entire construction. The pivoting wheel axle suspension ensures better ground following characteristics than conventional rigid systems so that any lifting of and improper weight distribution on individual wheels due to ground irregularities can largely be prevented.

The invention and further advantages and advantageous developments and embodiments of the invention will be described and explained in more detail with reference to the drawing.

BRIEF DESCRIPTION OF THE DRAWINGS

FIG. 2 is a cross-sectional view of the wheel suspension in FIG. 1; and

FIG. 3 is a view of a tractor-drawn tillage implement having an axle suspension according to the invention.

DESCRIPTION OF THE PREFERRED EMBODIMENT

Figure 1:
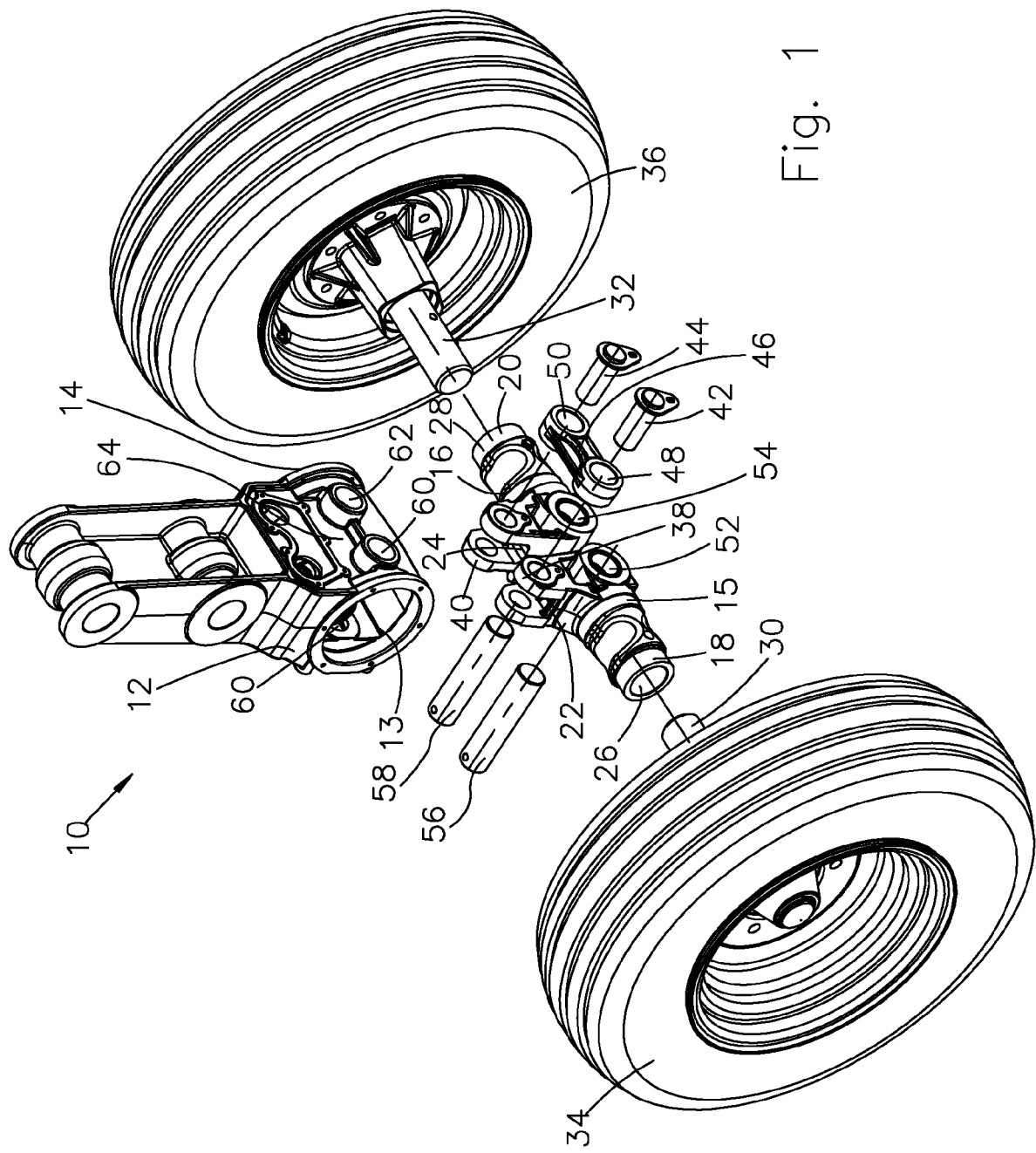
FIG. 1 is a perspective exploded view of a wheel suspension according to the invention.

Referring to FIGS. 1 and 2, a two-wheel axle suspension 10 according to the invention comprises a housing 12, in which axle carriers 15, 16 are arranged. The carriers 15, 16 extend out of the housing 12 through apertures 13, 14 on opposite sides of the housing 12. The axle carriers 15, 16 are of an articulated knuckle-joint design and comprise a first member 18, 20 and a second member 22, 24, which are arranged at right angles to one another.

The first members 18, 20 have ends with tubular shaped mounting areas 26, 28 which mount wheel axles 30, 32. Suspended on the wheel axles 30, 32 in a conventional manner are wheels 34, 36 which support the axle suspension 10 above the ground. The first members 18, 20 extend transversely to the direction of rotation of the wheels 34, 36 or generally parallel to the axes of rotation of the wheels 34, 36.

The second members 22, 24, which are generally upright and extend vertically relative to the ground, are rigidly connected to the first members 18, 20. The end areas of the second members 22, 24 are of shackle-shaped or bifurcated design and have bearing points in the form of bearing apertures 38, 40 which receive and accommodate connecting pins 42, 44.

The axle suspension 10 further comprises a rigid connection or connecting strut 46 having ends with guide apertures 48, 50 formed therein. A guide aperture 52, 54 which seats a pivot pin 56, 58 therein is formed between the first and the second members 18, 20 and 22, 24, respectively. The ends of the pivot pins 56, 58 are inserted into bearing apertures 60, 62, which are formed on a housing wall 64 of the housing 12.

The interaction of the components represented in FIG. 1 is illustrated in FIG. 2. The axle carriers 15, 16 are pivotally supported by their guide apertures 52, 54 on the pivot pins 56, 58 supported on the housing 12 in the bearing apertures 60, 62. The structure facilitates a pivoting movement of the axle carriers 15, 16 relative to the housing 12 about the longitudinal axes of the pivot pins 56, 58 forming the pivot axes. The axle carriers 15, 16 therefore constitute pivoting bodies which allow an up and down movement of the first members 18, 20 and the wheel axles 30, 32, and hence of the wheels 34, 36 in an upright or vertical direction relative to the ground.

The second members 22, 24 rigidly arranged at right angles to the first members 18, 20 consequently pivot respective first member 18, 20 is deflected as the wheels 34, 36 roll over an undulation in the ground, for example. The two second members 22, 24 extending vertically are constrained for articulated together via connecting strut 46 and the connecting pins 42, 44 carried in the bearing apertures 38, 40. The connecting strut 46 transmits a resulting pivoting movement of the one axle carrier 15, 16 to the other axle carrier 15, 16, so that a pivoting movement of the one axle carrier 15, 16 gives rise to a pivoting movement of the other axle carrier 15, 16 in the same direction. The connecting strut 46 and the connecting pins 42, 44 (together with the bearing apertures 38, 40) therefore constitute connecting means which connect the second members 22, 24 together. If the right-hand wheel 36 on the right-hand side of the axle suspension 10 represented in FIG. 2 runs over a ground elevation, for example, the first right-hand member 20 moves upwardly, so that the right-hand axle carrier 16 performs an anticlockwise pivoting movement. The right-hand second member 24 is automatically swiveled to the left. At the same time the connecting structure (the connecting strut 46 with the connecting pins 42, 44) constrains the left-hand second member 22 into a leftward pivoting movement so that the left-hand axle carrier 15 also performs an anticlockwise pivoting movement, which in turn moves the left-hand first member 18 downwardly. The two axle carriers 15, 16 therefore perform a swiveling movement in the same anticlockwise direction. As a result, the left-hand wheel 34 moves downwardly, compensating for a difference in height between the wheels 34, 36 and keeping both wheels 34, 36 in uniform contact with the ground. In the opposite case (clockwise pivoting movement of the axle carriers 15, 16) the leftward pivoting movement of the left-hand first member 22 is transmitted to the right-hand first member 24, so that the left-hand wheel 34 moves upwardly and the right-hand wheel 36 moves downwardly.

FIG. 3 shows an applied example of an axle suspension 10 according to the invention on a combination cultivating and sowing machine 100. The combined cultivating and sowing machine 100 has a frame 112 which extends in the forward direction (from left to right in the drawing) and which is supported on the ground by the wheels 34, 36 connected to the axle suspension 10. The front end the frame 112 is connected by a drawbar 116, via a detachable coupling 120, to a towing vehicle 118 such as an agricultural tractor.

Forwardly of the wheels 34, 36 the frame 112 carries a seed box 122 for holding seed. Metering systems, not represented in the drawing, measure out the seed from the seed box 122 and deliver the seed through seed lines to conventional planting units 124 arranged at the rear of the frame 112. The units 124 as shown comprise a furrow opener 126, closing wheels 128 and seed coulters 130. Seed is delivered to the furrow produced by the furrow opener 126, and the closing wheels 128 subsequently closing the furrow over the seeds.

Multiple units 124 are supported side by side on an implement carrier 132 supported on the frame 112 and extending transversely to the forward direction. In front of the seed box 122 a carrier frame 136 is fixed beneath the frame 112. The carrier frame 136 carries a pivoting frame 138 supporting a soil tilling implement 140 such as a disk harrow. Other soil tilling implements 140 may be used instead of the disk harrow.

Although the invention has only been described with reference to one exemplary embodiment, many different alternatives, modifications and variants coming with the scope of the present invention will become apparent to the person skilled in the art in the light of the description above and the drawings.

The invention claimed is:

1. An axle suspension for first and second implement ground support wheels adapted for rotation about first and second wheel axes, the wheels supporting an implement frame, the axle suspension comprising a housing connected to the implement frame, the housing having an interior portion supporting first and second axle carriers for pivoting in upright directions about first and second pivotal axes, respectively, the axle carriers each comprising first and second outwardly extending members extending on opposite sides of the housing in the direction of the wheel axes, wherein the first and second wheel axes are generally fixed with respect to the first and second outwardly extending members, first and second upright members fixed to the outwardly extending members for pivoting therewith and with the first and second wheel axes about the first and second pivotal axes, a connector extending between the upright members and connected to the upright members at a location offset radially from the first and second pivotal axes, the connector constraining the axle carriers for rotation in the same direction about the pivotal axes so that as one of the first and second wheel axes moves upwardly the other of the first and second wheel axes moves downwardly.

2. The axle suspension as set forth in claim 1 wherein the first and second pivotal axes are located adjacent one another within the housing, and wherein the first and second upright members extend upwardly from the first and second pivotal axes.

3. The axle suspension as set forth in claim 1 wherein the connector comprises a strut, and connecting pins pivotally connecting the strut to the first and second upright members.

4. The axle suspension as set forth in claim 1 wherein the connector is offset above the first and second pivotal axes, the upright members defining a lever arm with the pivotal axes.

5. The axle suspension as set forth in claim 3 wherein the strut is supported at uppermost extremities of the upright members within the housing.

6. The axle suspension as set forth in claim 1 wherein the first pivotal axis is located between the first upright member and the first outwardly extending member.

7. The axle suspension as set forth in claim 1 wherein the first and second member are fixed at an angle of approximately 90° with respect to each other.

8. The axle suspension as set forth in claim 1 wherein the pivot axes comprise pivot pins supported in a wall of the housing.

9. The axle suspension as set forth in claim 8 wherein the housing wall includes bearing apertures supporting the pivot pins.

10. The axle suspension as set forth in claim 3 wherein the second members include bifurcated apertured ends which journal the connecting pins.

11. The axle suspension as set forth in claim 3 wherein connecting strut has opposite ends with guide apertures receiving the connecting pins.

12. The axle suspension as set forth in claim 3 wherein the pivot pins and the connecting pins are generally horizontal and extend transversely to the wheel axes.

13. The axle suspension as set forth in claim 1 wherein the first member includes a tubular wheel mounting area for receiving a ground support wheel axle.

14. An axle suspension for a soil tillage implement frame, the axle suspension comprising first and second implement ground support wheels, a housing connected to the implement frame, the housing having an interior portion supporting first and second axle carriers for pivoting about first and second pivotal axes, respectively, the axle carriers each comprising first and second outwardly extending axle members with outer ends extending on opposite sides of the housing, the axle members extending outwardly in opposite directions from the first and second pivotal axes so that as the first and second axle carriers pivot in the same direction about the first and second pivotal axes the outer ends will move in opposite vertical directions, first and second upright members fixed to the outwardly extending members for pivoting therewith and with the first and second outwardly extending axle members about the first and second pivotal axes, a connector extending between the upright members and connected to the upright members at a location offset radially from the first and second pivotal axes, the connector constraining the axle carriers for rotation in the same direction about the pivotal axes so that as the outer end of one of the first and second wheel axes moves upwardly the outer end of the other of the first and second wheel axes moves downwardly.

15. The axle suspension as set forth in claim 14 wherein connector is supported above the first and second axes.

16. The axle suspension as set forth in claim 14 wherein the first and second pivotal axes and the connector are located within the housing.

17. The axle suspension as set forth in claim 16 wherein the connector is pivotally connected to the upright members at pivotal locations located within the housing.

18. The axle suspension as set forth in claim 17 wherein the pivotal locations are arranged an uppermost portions of the upright members.

\* \* \* \* \*